United States Patent
Machado

(10) Patent No.: US 6,857,176 B2
(45) Date of Patent: Feb. 22, 2005

(54) TANDEM WHEEL UNLOCKING ASSIST DEVICE

(76) Inventor: John Machado, 5140 Merit Dr., Flint, MI (US) 48506

(*) Notice: Subject to any disclaimer, the term of this patent is extended or adjusted under 35 U.S.C. 154(b) by 114 days.

(21) Appl. No.: 10/298,691

(22) Filed: Nov. 19, 2002

(65) Prior Publication Data

US 2004/0094930 A1 May 20, 2004

(51) Int. Cl.$^7$ ................................................ B23P 19/00
(52) U.S. Cl. ..................... 29/426.5; 29/244; 29/270; 280/149.2; 280/433; 294/19.1
(58) Field of Search ............................ 29/426.5, 802, 29/244, 247, 270; 280/149.2, 433; 294/19.1

(56) References Cited

U.S. PATENT DOCUMENTS

| | | |
|---|---|---|
| 5,199,732 A | 4/1993 | Lands et al. |
| 5,232,234 A | 8/1993 | McCombs |
| 5,314,201 A | 5/1994 | Wessels |
| 5,480,171 A | 1/1996 | Cheffey |
| 5,716,071 A | 2/1998 | Stanley et al. |
| 6,322,091 B1 | 11/2001 | Lindley |

*Primary Examiner*—David P. Bryant
(74) *Attorney, Agent, or Firm*—Siemens Patent Services LC

(57) ABSTRACT

A device for assisting in the release of a tandem wheel locking pin from a locking rail of a semi-trailer is disclosed. In a basic embodiment, the device consists of a gripping plate which engages the locking pin release rod of the tandem unit, a helical spring, and a hook plate which engages a frame member of the tandem unit such that tension is maintained on the spring. By locking the brakes of the tandem unit and rocking the trailer, friction between the locking rail and the locking pin is released, and the tension of the spring can pull the pin, at least partially, from the locking rail. An alternate embodiment of the device includes a positioning assist pin which may be placed into the locking rail at the point at which the tandem unit is to be moved to aid in aligning the locking pins at a new location.

13 Claims, 7 Drawing Sheets

US 6,857,176 B2

TANDEM WHEEL UNLOCKING ASSIST DEVICE

BACKGROUND OF THE INVENTION

1. Field of the Invention

The present invention relates to items for facilitating maintenance of over the road tractor trailers. More particularly, the invention comprises a device for releasing the locking pin holding the rear, tandem wheels of a trailer when the pin has become rusted or encrusted in place or between the tandem unit and the locking rail.

2. Description of the Prior Art

Over the road semi-trailers typically have a pair of tandem wheels, or bogies, which may be moved along a portion of the length of the trailer to adjust for load weight and distribution and, when practical, to reduce the wheel base of the trailer to facilitate easier turning. A pair of locking rails along the frame of the trailer contain a plurality of holes which receive a locking pin located in the tandem unit, allowing locking of the tandem unit in any desired position along the rails. Frequently, however, due to rust, a build up of road grime or simply binding between the tandem unit and the rails, the locking pins become stuck in the rails such that an extreme effort is required to release them.

A number of devices have been disclosed throughout the years to aid in the release of the locking pins and for relocation of the tandem unit along the rails.

A PIN RETRACTOR OPERATOR is disclosed in U.S. Pat. No. 6,322,091, issued to Joseph W. Lindley on Nov. 27, 2001. Lindley's refractor is a portable tool.

Patrick L. Stanley, et al., disclose an ELECTRICALLY OPERATED SLIDER RELEASE in U.S. Pat. No. 5,716,071, issued on Feb. 10, 1998. Again, Stanley, et al., requires a permanent installation with an electric motor and related electrical wiring, whereas the present invention requires no installation.

U.S. Pat. No. 5,480,171, issued on Jan. 2, 1996, to Dean C. Cheffey, discloses a SLIDER LOCKING MECHANISM which is a permanently installed element of the bogie, while the present invention is a removable tool for assisting in the disengagement of the locking pins.

A LOCKING SYSTEM FOR A SEMITRAILER SLIDING UNDERCARRIAGE, is disclosed in U.S. Pat. No. 5,314,201, issued to Larry W. Wessels, on May 24, 1994. The device of Wessels is, once again, an integral part of the bogie assembly, while the present invention is a tool for assisting in the release of frozen locking pins.

Clint McCombs discloses a PNEUMATICALLY OPERATED ADJUSTABLE SLIDING TRAILER SUPPORT, a bogie unit with a pneumatically operated locking system, in U.S. Pat. No. 5,232,234, issued on Aug. 3, 1993. By contrast, the present invention presents a tool for assisting in the release of rusted or encrusted locking pins of manually operated locking pin assemblies.

U.S. Pat. No. 5,199,732 issued to Herbert D. Lands, et al., on Apr. 6, 1993, presents an APPARATUS FOR UNLOCKING A BOGIE ON A TRACTOR-TRAILER RIG, a pneumatically operated system for disengaging the locking pins. Unlike the present invention, Lands requires retrofitting of the trailer with a mechanism which must be linked to the trailer's pneumatics system.

None of the above inventions and patents, taken either singly or in combination, is seen to describe the instant invention as claimed.

SUMMARY OF THE INVENTION

Semi-trailers often have tandem wheel units which may be moved along a pair of locking rails such that they be relocated as load requirements vary. The release pins for the tandem wheel units frequently become bound in the locking rail due to rust, accumulations of road grime, or friction between the pin and the rail to a degree that they are difficult to pull free.

The present invention consists of a gripping plate which engages the locking pin release rod of the tandem wheel unit, a helical spring, and a hook plate which engages a frame member of the tandem wheel unit such that tension is maintained on the spring. By locking the brakes of the tandem unit and rocking the trailer, friction between the locking rail and the locking pin is released, and the tension of the spring can pull the pin, at least partially, from the locking rail without unnecessary physical exertion or risk of bodily injury.

Accordingly, it is a principal object of the invention to provide a device for assisting in the release of a tandem wheel locking pin from a locking rail which is compact and easily stored.

Another object of the invention is to provide a device for assisting in the release of a tandem wheel locking pin from a locking rail which will provide added safety to the user over currently available alternatives.

It is another object of the invention to provide a device for assisting in the release of a tandem wheel locking pin from a locking rail which is easy to use.

It is a further object of the invention to provide a device for assisting in the release of a tandem wheel locking pin from a locking rail which is effective in its use.

Still another object of the invention is to provide a device for assisting in the release of a tandem wheel locking pin from a locking rail which is durable.

An additional object of the invention is to provide a device for assisting in the release of a tandem wheel locking pin from a locking rail which is economical to manufacture, and therefor to use.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
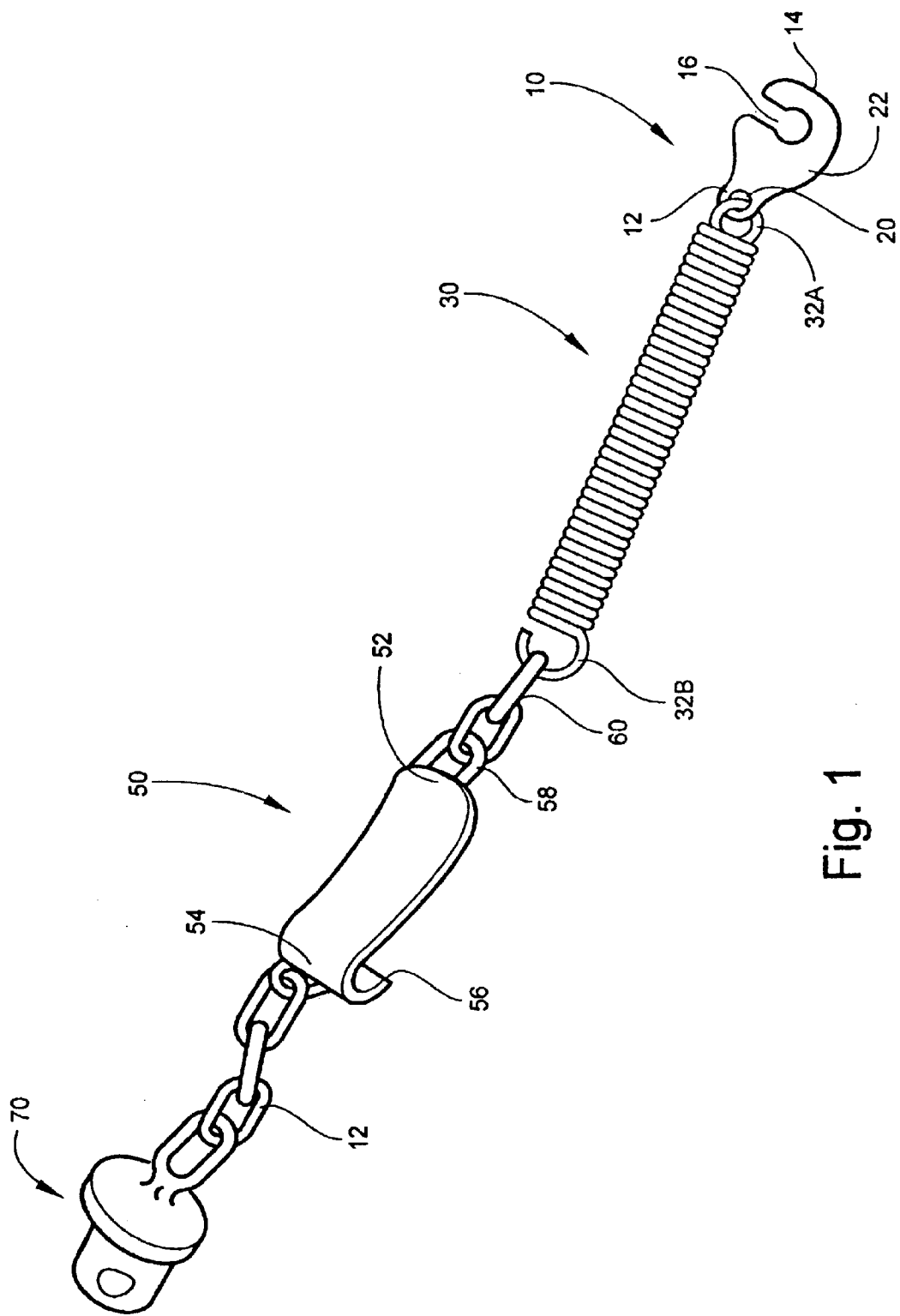
FIG. 1 is an overall perspective view of the unlocking assist device of the present invention.

The tandem wheel unlocking assist device 1 of the present invention (FIG. 1) consists of a gripping plate 10, a helical spring 30, a hook plate 50, and a pin 70.

Figure 2:
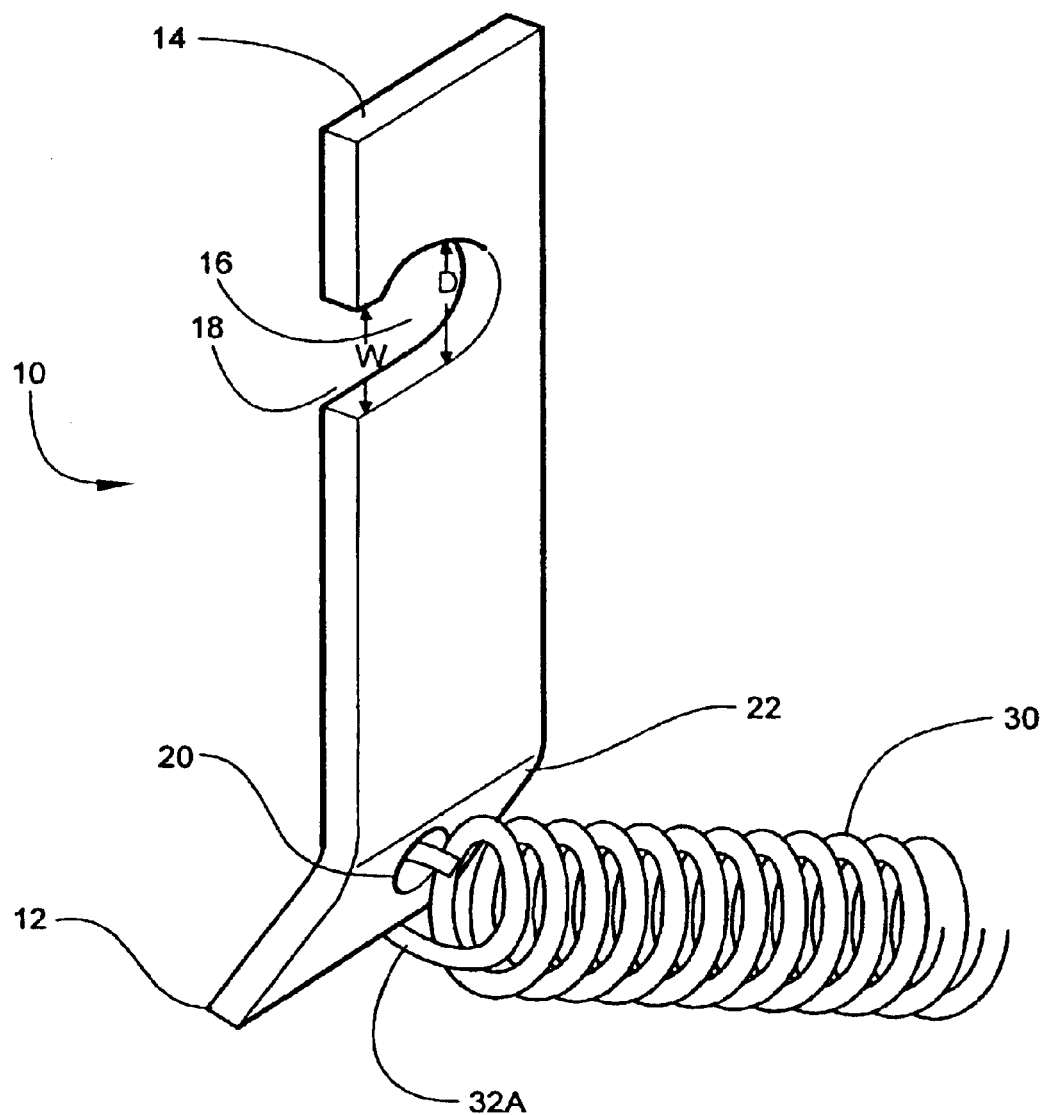
FIG. 2 is a perspective view of the gripping plate of the present invention.
Figure 4:
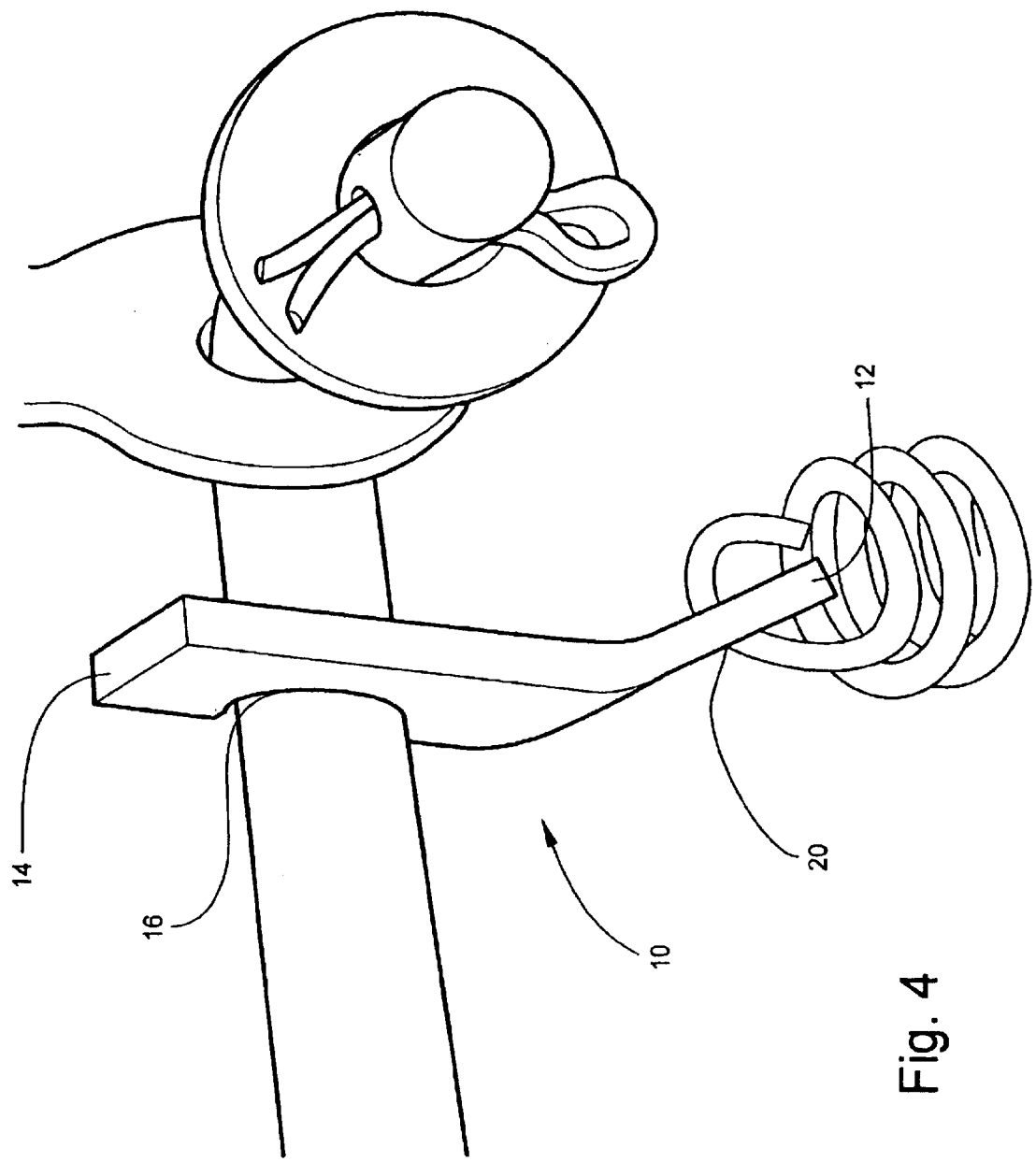
FIG. 4 is an environmental perspective view of the gripping plate of the present invention as installed on a locking pin release bar.
Figure 6:
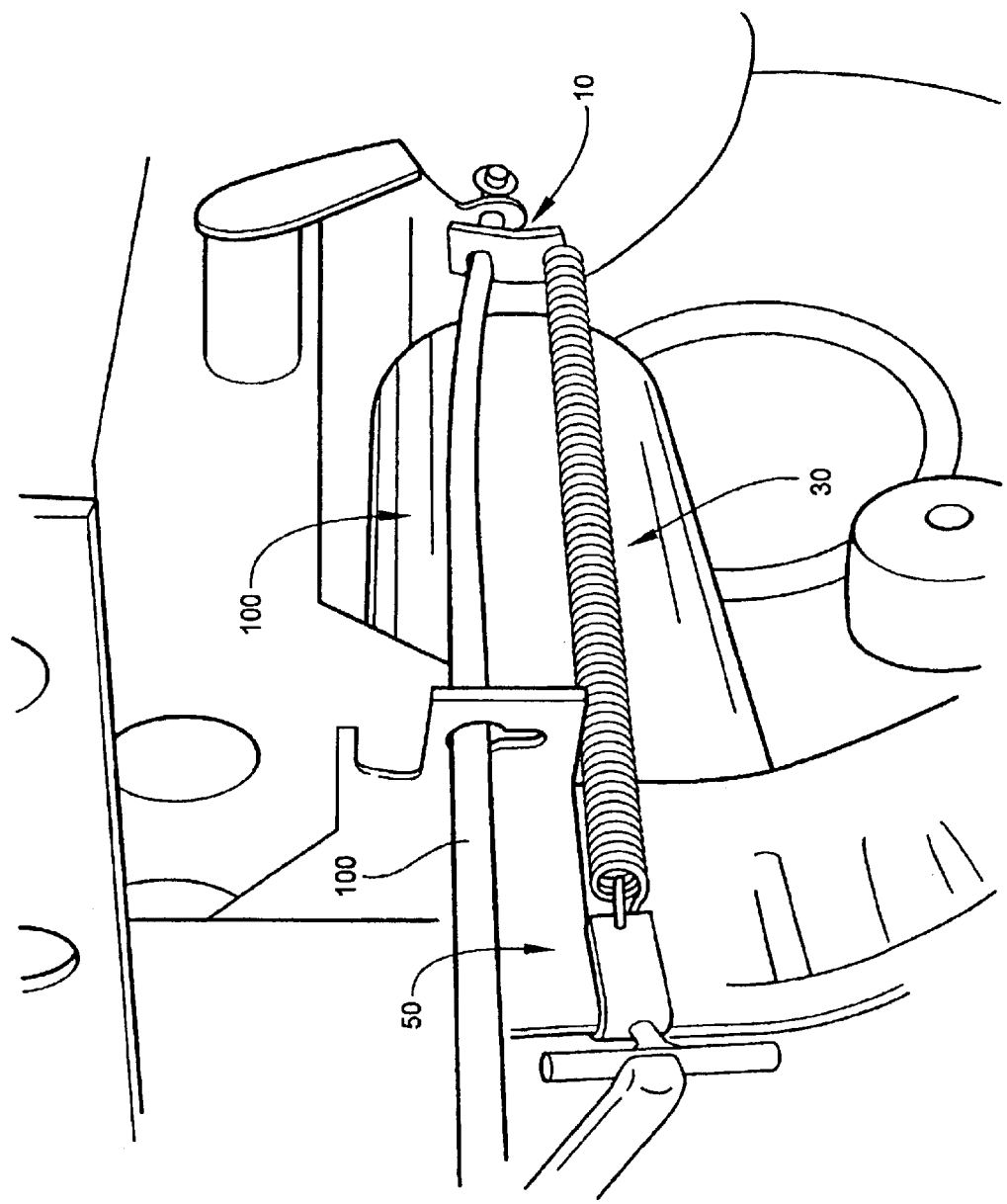
FIG. 6 is an environmental perspective view of the unlocking assist device of the present invention as installed on the locking pin release bar and frame of a tandem unit.
Figure 7:
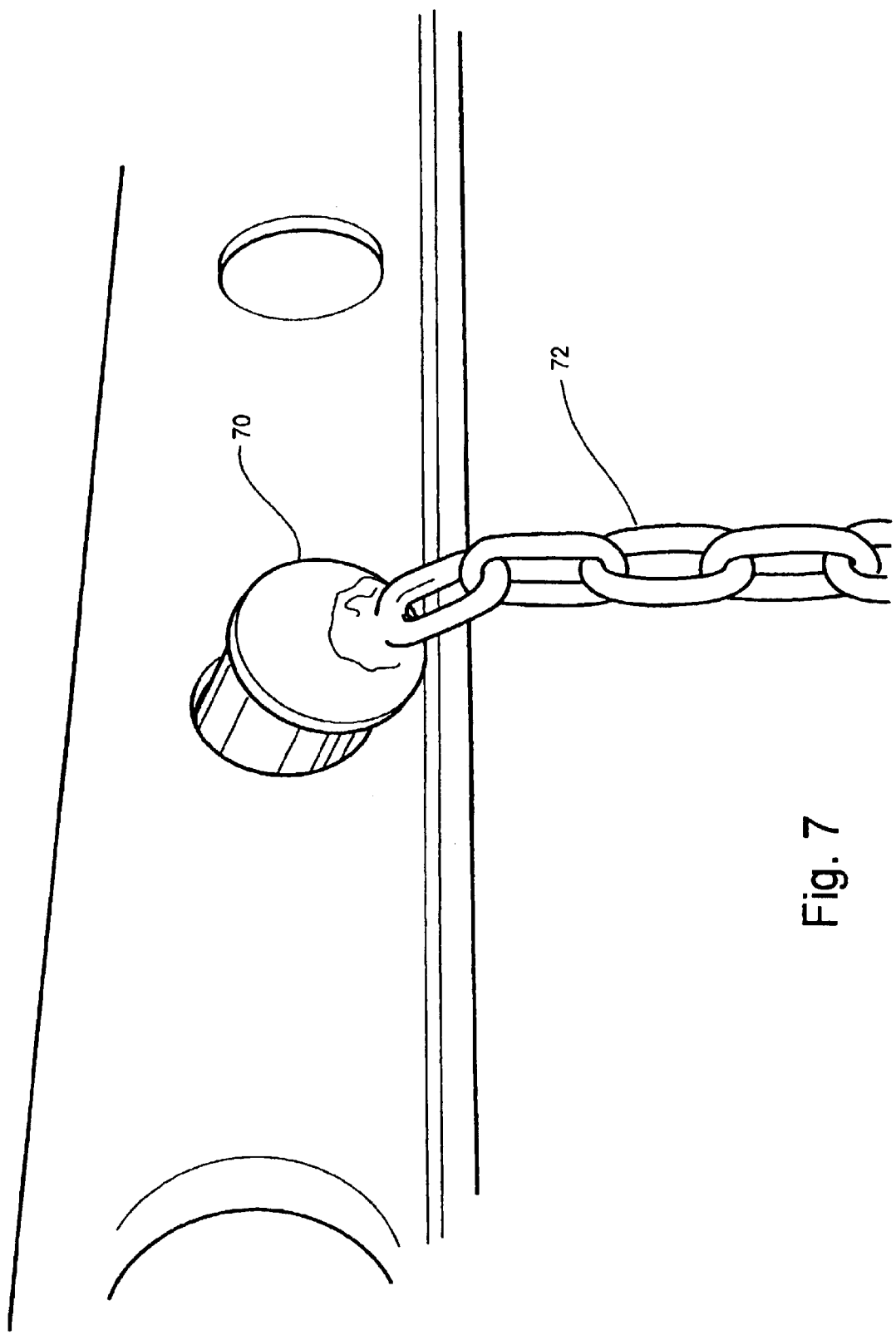
FIG. 7 is an environmental perspective view of the pin of the present invention as installed in the locking rail of a semi-trailer.

Referring now to FIGS. 2, 4 and 6, gripping plate 10 is typically fanned of flat plate steel or other material having a high tensile strength and has a proximal end 12, a distal end 14, a first edge and a second edge, a thickness and a width. A notch 16 is formed in gripping plate proximate distal end 14, notch 16 having an opening 18 slightly wider than the diameter of a typical pull rod 100 (FIG. 6+) and a circular diameter D greater than the width of the opening 18, thereby allowing gripping plate 10 to hang from pull rod 100 without slipping from rod 100. An aperture 20 is formed in gripping plate 10 near proximal end 12. The flat plate material of gripping plate 10 has a bend 22 at a point between notch 16 and aperture 20 such that gripping plate 10 deviates from a flat plane.

Figure 3:
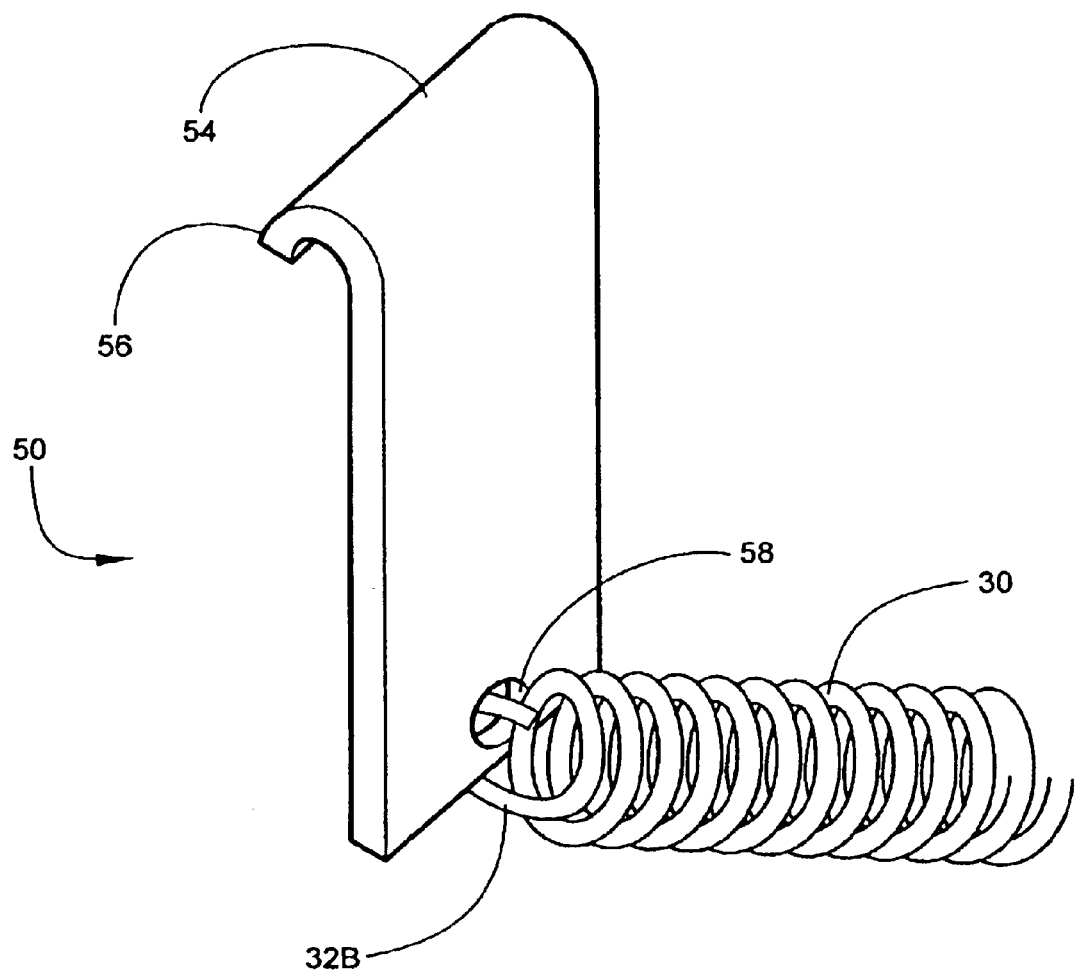
FIG. 3 is a perspective view of the hook plate of the present invention.
Figure 5:
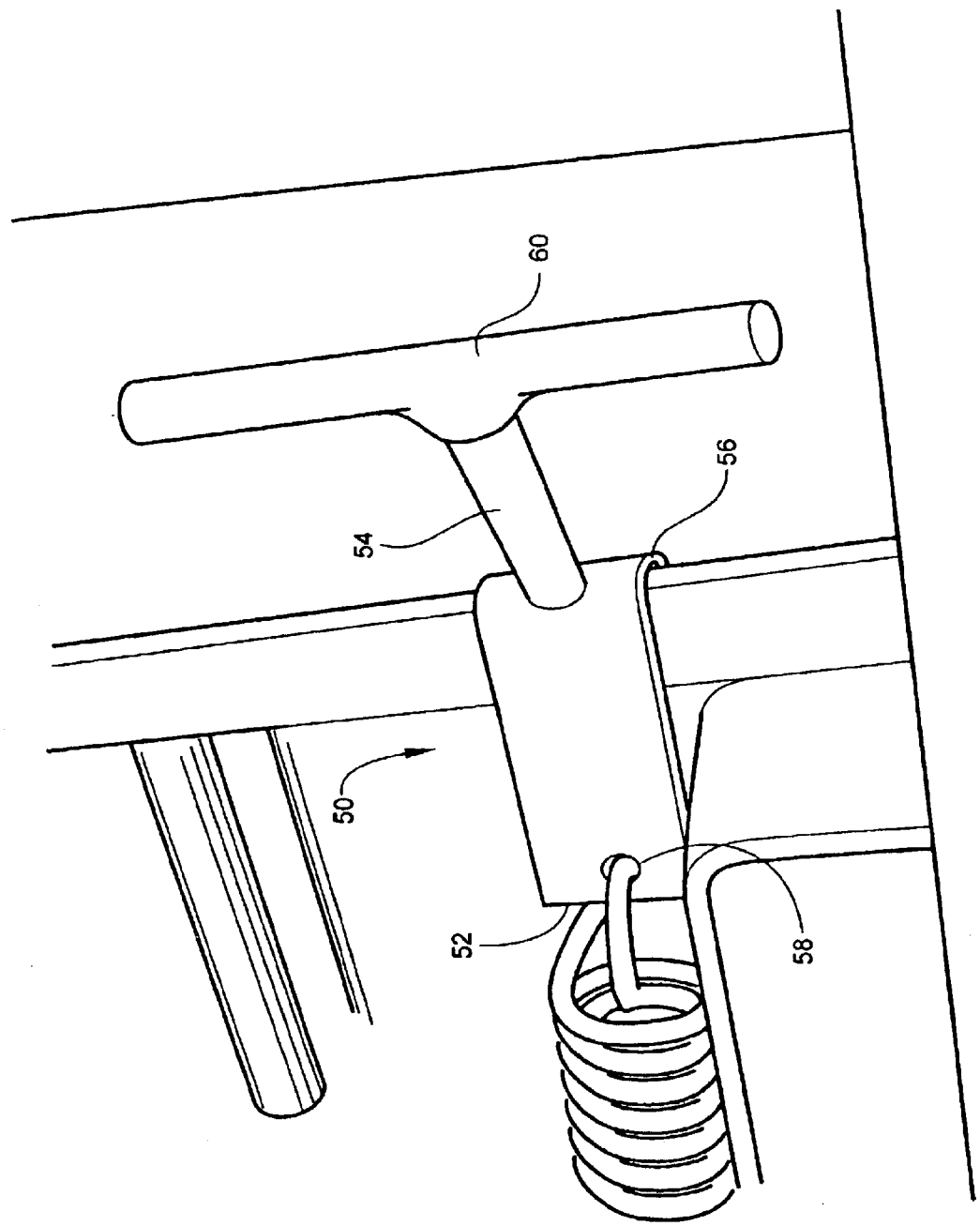
FIG. 5 is an environmental perspective view of the hook plate of the present invention as installed on the frame of a tandem unit.

Now turning to FIGS. 3, 5, and 6, hook plate 50 is, likewise, typically formed of a flat plate steel or other material having a high tensile strength. Hook plate 50 has a proximal end 52 and a distal end 54. The flat plate material of hook 50 is bent to form a "J" shaped hook 56 at distal end 54. An aperture 58 is formed through hook plate 50 near proximal end 52. A handle 60 attached to the exterior of the "J" hook 56 (FIG. 5) facilitates applying tension to the spring 30 during installation of the unlocking assist device 1. While depicted as a "T" shaped handle 60, it would be evident to one skilled in the art that handle 60 could be of any shape, including, but not limited to, a ring.

It would be evident to one skilled in the art that each of gripping plate aperture 20 and hook plate aperture 58 could be formed either by the formation of a hole through the flat plate material of gripping plate 10 and hook plate 50, as shown at FIGS. 2 and 3, or by any other method known to the art, such as, but not limited to the attachment of a chain link at proximal ends 12 and 52. It would be further evident to one skilled in the art that gripper plate 10 and hook plate 50 could be formed by methods such as, but not limited to, casting, in lieu of cutting from flat plate material, without departing from the spirit of the present invention.

Gripping plate 10 and hook plate 50 are joined by a helical spring 30, with spring hooks 32A and 32B passing through gripping plate aperture 20 and hook plate aperture 58, respectively. In the interest of increased flexibility of the unlocking assist device 1, one or more chain links 60 (FIG. 1) may be joined through gripper plate aperture 20 and hook plate aperture 58 and attached to spring hooks 32A and 32B.

In addition to a handle 60, hook plate 50 could, in an alternate embodiment, have a pin 70 (FIGS. 1 and 6) attached thereto by a tether 72. Pin 70 is configured and adapted to be placed into a selected hole on the locking rail of a semi-trailer in order to stop the movement of the trailer relative to the tandem unit at a selected position. Tether 72 could be of a variety of different configurations, including, but certainly not limited to chain links, braided wire, or rope.

Referring now to FIG. 6, the unlocking assist device 1 of the present invention is uses by:

a. slipping the notch 16 of gripping plate 10 over the locking pin release rod 100 of a semi-trailer tandem wheel unit such that the bend 22 in gripping plate 10 extends toward the frame of the semi-trailer. The increased diameter D of the notch over the width W of the opening 18 ensures that gripping plate 10 will not slip from the locking pin release rod 100, b. stretching the spring 30, causing the edges of notch 16 to bite into the locking pin release rod 100, c. hooking hook 56 of hook plate 50 around a frame member of the tandem wheel unit such that tension is maintained on spring 30, d. locking the brakes of the tandem wheel unit, e. moving the trailer in a front to rear rocking manner by the movement of the attached tractor of the tractor and semi-trailer unit, thereby releasing the pressure exerted on the locking pin by the locking rail such that the tension on spring 30 extracts the pin from the locking rail.

It is to be understood that the present invention is not limited to the embodiments described above, but encompasses any and all embodiments within the scope of the following claims.

What is claimed is:

1. A device for assisting in the release of a tandem wheel locking pin from a locking rail of a semi-trailer comprising:
    gripping means for gripping the locking pin release bar of a tandem wheel unit, said gripping means comprising:
        a gripping plate having:
            a proximal end and a distal end, a first edge and a second edge, a thickness and a width,
            a notch formed through said thickness of said plate near said distal end thereof, said notch opening to said first edge and having a width minimally greater than a locking pin release rod of a semi-trailer tandem wheel unit, the edges of said notch adapted to grip a locking pin release rod when tension is exerted upon said gripping plate, and
            an aperture formed through said gripping plate near said proximal end thereof,
    a bend being formed in said gripping plate between said notch and said aperture such that said gripping plate deviates from a single plane,
    hooking means for engaging the frame of a tandem wheel unit, and
    tensioning means for creating compressive tension between said gripping means and said hooking means;
    said device adapted to apply extracting tension on a retaining pin of a tandem wheel unit.

2. A device for assisting in the release of a tandem wheel locking pin from a locking rail of a semi-trailer, as defined in claim 1, wherein said hooking means further comprises:
    a hook plate having:
        a proximal end and a distal end, and a thickness and a width,
        a hook formed at said distal end thereof, and
        an aperture formed through said hook plate near said proximal end thereof.

3. A device for assisting in the release of a tandem wheel locking pin from a locking rail of a semi-trailer, as defined in claim 3, wherein said tensioning means comprises a spring, said spring joined to both of said gripping plate and said hook plate at said apertures formed in said gripping plate and said hook plate.

4. A device for assisting in the release of a tandem wheel locking pin from a locking rail of a semi-trailer, as defined in claim 3, wherein said spring comprises a helical spring.

5. A device for assisting in the release of a tandem wheel locking pin from a locking rail of a semi-trailer, as defined in claim 4, at least one chain link connects said helical spring to at least one of said gripping plate and said hook plate.

6. A device for assisting in the release of a tandem wheel locking pin from a locking rail of a semi-trailer, as defined in claim 2, wherein said hook plate further comprises a handle affixed thereto, said handle adapted to facilitate exerting tension on said tensioning means.

7. A device for assisting in the release of a tandem wheel locking pin from a locking rail of a semi-trailer, as defined in claim 1, further comprising positioning assist means for assisting in aligning the tandem wheel unit with a new hole in a locking rail of a semi-trailer, said positioning assist means comprising a pin, said pin adapted to matingly engage a hole in a locking rail of a semi-trailer, thereby limiting the motion of a tandem wheel unit relative to the locking rail during reposition of the tandem wheel unit.

8. A device for assisting in the release of a tandem wheel locking pin from a locking rail of a semi-trailer, as defined in claim 7, wherein said pin of said positioning assist means is attached to said device by means of a tether.

9. A device for assisting in the release of a tandem wheel locking pin from a locking rail of a semi-trailer comprising:
   a gripping plate having:
      a proximal end and a distal end, a first edge and a second edge, a thickness and a width,
      a notch formed through said thickness of said plate near said distal end, said notch opening to said first edge and having a width minimally greater than a locking pin release rod of a semi-trailer tandem wheel unit, the edges of said notch adapted to grip a locking pin release rod when tension is exerted upon said gripping plate,
      an aperture formed through said gripping plate adjacent said proximal end thereof,
      a bend being formed in said gripping plate between said notch and said aperture such that said gripping plate deviates from a single plane;
   a hook plate having:
      a proximal end and a distal end, a thickness and a width,
      a hook formed at said distal end thereof, and
      an aperture formed through said hook plate near said proximal end thereof, and
   a helical spring, spring joined to both of said gripping plate and said hook plate at respective of said apertures formed in said gripping plate and said hook plate.

10. A device for assisting in the release of a tandem wheel locking pin from a locking rail of a semi-trailer, as defined in claim 9, wherein said hook plate further comprises a handle affixed thereto, said handle adapted to facilitate exerting tension on said spring and attaching said hook to a frame member of a tandem wheel unit.

11. A device for assisting in the release of a tandem wheel locking pin from a locking rail of a semi-trailer, as defined in claim 9, further comprising positioning assist means for assisting in aligning the tandem wheel unit with a new hole in a locking rail of a semi-trailer, said positioning assist means comprising a pin, said pin adapted to matingly engage a hole in a locking rail of a semi-trailer, thereby limiting the motion of a tandem wheel unit relative to the locking rail during reposition of the tandem wheel unit.

12. A device for assisting in the release of a tandem wheel locking pin from a locking rail of a semi-trailer, as defined in claim 11, wherein said pin of said positioning assist means is attached to said device by a tether.

13. A method for releasing a stuck tandem wheel locking pin from a locking rail of a semi-trailer comprising the steps of:
   utilizing a device for assisting in the release of a tandem wheel locking pin from a locking rail semi-trailer comprising:
      a gripping plate having:
         a proximal end and a distal end, a first edge and a second edge, and a thickness and a width,
         a notch formed through said thickness of said plate near said distal end thereof, said notch opening to said first edge and having a width minimally greater than a locking pin release rod of a semi-trailer tandem wheel unit, the edges of said notch adapted to grip a locking pin release rod when tension is exerted upon said gripping plate,
         an aperture formed through said gripping plate near said proximal end thereof,
      a hook plate having:
         a proximal end and a distal end, and a thickness and a width,
         a hook formed at said distal end thereof, and
         an aperture formed through said hook plate adjacent said proximal end thereof, and
      a helical spring, spring joined to both of said gripping plate and said hook plate at respective of said apertures formed in said gripping plate and said hook plate, and
   slipping said notch of said gripping plate over the locking pin release rod of a semi-trailer tandem wheel unit such that said proximal end of said gripping plate extends toward the locking rail of the semi-trailer from said bend formed in said gripping plate,
   stretching said spring causing said edges of said notch to bite into the locking pin release rod, and
   hooking said hook around a frame member of the tandem wheel unit such that tension is maintained in said spring,
   locking the brakes of said tandem wheel unit,
   moving the trailer in a front to rear rocking manner by the movement of an attached tractor of the tractor and semi-trailer unit, thereby releasing the pressure exerted on the locking pin by the locking rail such that the tension on said spring extracts the pin from the locking rail.

* * * * *